Oct. 8, 1935.     H. BAUER     2,016,702
STRUCTURAL CONNECTING MEMBER
Filed March 18, 1935     2 Sheets-Sheet 2
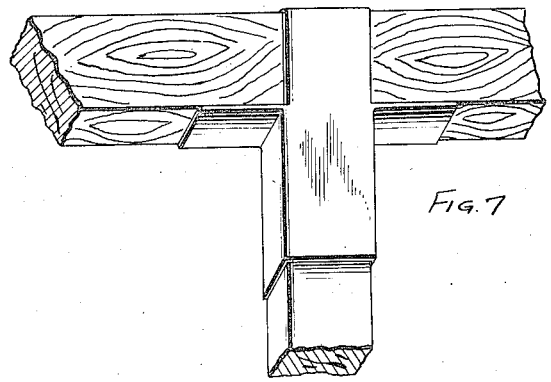
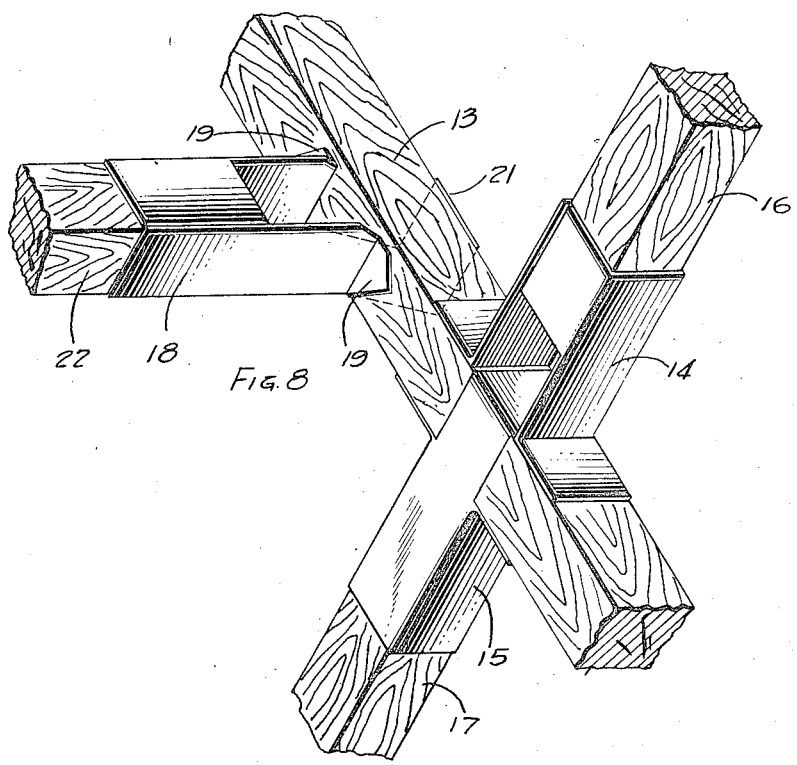
INVENTOR.
HARRY BAUER
BY
ATTORNEY.

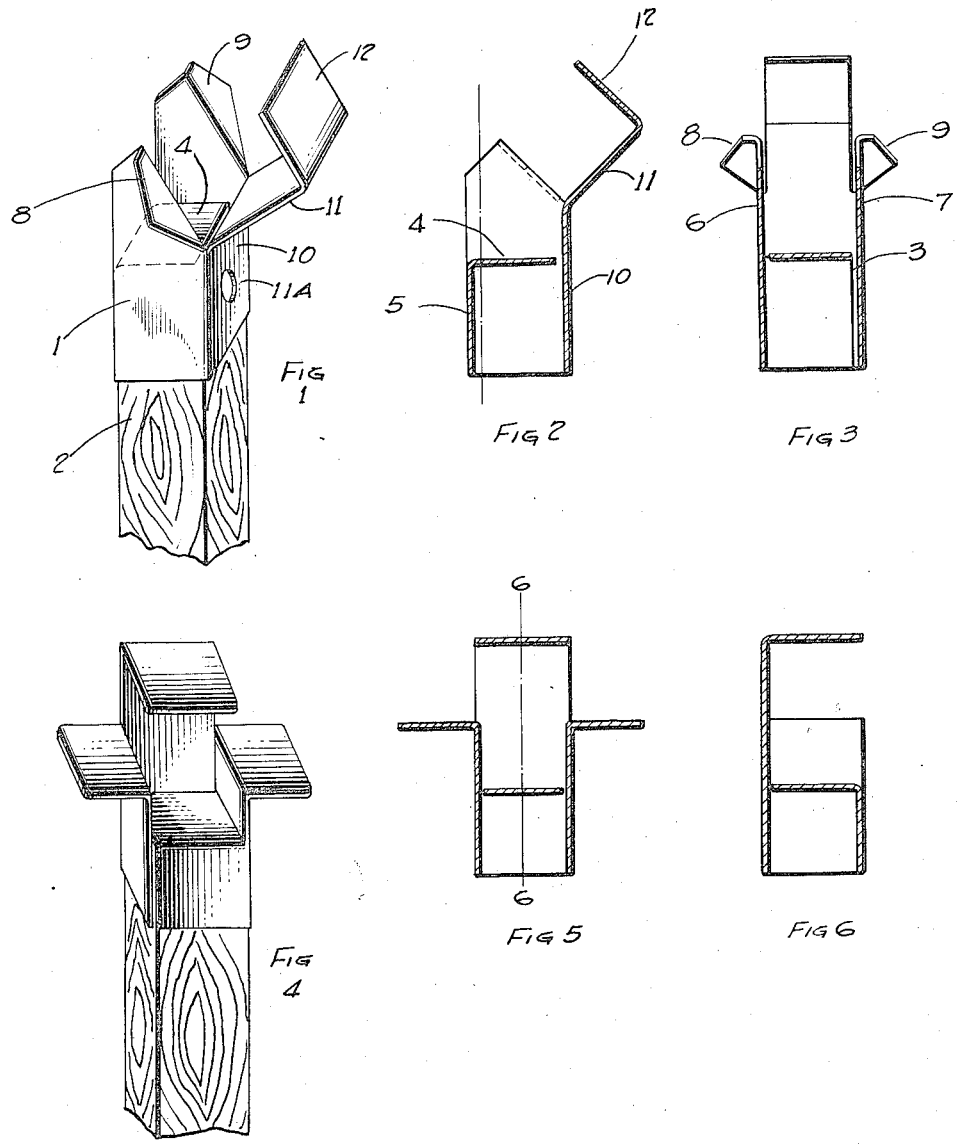

Patented Oct. 8, 1935

2,016,702

UNITED STATES PATENT OFFICE 2,016,702

STRUCTURAL CONNECTING MEMBER

Harry Bauer, Lakewood, Ohio

Application March 18, 1935, Serial No. 11,582

4 Claims. (Cl. 20—92)

The invention relates to connecting members for the assembly of structural skeletons or shapes. It is particularly directed to the provision of a connecting member which may be readily formed from sheet metal and which requires no nails, screws, bolts, or other auxiliary securing means in order to obtain a rigid yet easily adjustable, connectable, and removable jointure.

In its several embodiments, which are more particularly described and set forth hereinbelow, my connecting member is preferably adapted to the construction of so-called "building sets" for juvenile instruction or amusement, but it is readily apparent that the inventive idea embodied herein may be directed to the formation of joints or connections in ordinary building construction.

Previous inventions in this field have used perforated metal or wood strips joined together by means of similarly perforated junction members, said strips and members being usually secured, during assembly, by screws, bolts, nails or other auxiliary means. It is an object of my invention to make possible the arrangement and assembly of various structural shapes without the aid of bolts, cotter pins, or tools of any description, either in assembling or in disassembling the various parts. This arrangement and assembly of co-acting parts may be effected with no more effort than can be made by a child of the age ordinarily interested in toys of this nature. I may also construct my connecting members in such a way that the child is protected from cuts and scratches which are often encountered in the use of metallic building sets.

A further object of the invention is the accomplishment of a rigid connection of the component parts, making a strong and substantially permanent assembled form, if permanency is desired.

An additional object is the provision of a structural connecting member from which can be obtained any form of vertical, horizontal, or angular extension to suit the wishes of the builder.

The above and other objects may be more fully understood and appreciated from a consideration of the following description and the attached drawings wherein Figure 1 is a perspective view of one of my connecting members set in place on the end of a wooden building strip.

Figure 2 is a vertical section through a connecting member similar to that shown in Figure 1.

Figure 3 is a vertical section taken on the line 3—3 of Figure 2.

Figure 4 is a perspective view of a slightly different form of connecting member embodying my invention.

Figure 5 is a vertical section through a connecting member similar to that shown in Figure 4.

Figure 6 is a vertical section taken on the line 6—6 of Figure 5.

Figure 7 and Figure 8 are pictorial representations, in perspective of various jointure methods rendered possible by using connecting members such as those shown in Figures 1 to 6.

Referring first to the embodiment shown in Figures 1, 2, and 3, numeral 1 designates a connecting member formed from sheet metal and slidably fitted on the end of a wooden structural strip 2. A portion of said member is formed as a hollow tube of rectangular cross section, split longitudinally as at 3. A stoppage means 4, to prevent endwise movement of said wooden strip, is formed by turning inwardly the terminal portion of one of the flat sides 5, and the cubical metal portion so formed I hereinafter term the body portion. Beyond said body portion, and forming an integral continuation thereof, two opposite remaining sides 6 and 7 are flanged outwardly as at 8 and 9, in angular relationship with the longitudinal dimension of the hollow portion, and the remaining side 10 is first outwardly turned, as at 11, and then inwardly flanged, as at 12, in such a manner that between said flanges 8, 9, and 12, a wooden cross-member 13 may be inserted in tight fitting but slidable relationship, as best seen in Figures 7 and 8. The dimensions of the body portion may be so regulated that, in conjunction with the longitudinal slit 3 an easily assembled yet relatively permanent spring-fit connection is maintained as an end jointure, and the construction and arrangement of the lateral flanges 8, 9, and 12 in Figures 1 to 3, maintain a satisfactorily stable adherence to the wooden cross-member therebetween, and maintain said second wooden construction strip in transverse and angular juxtaposition with the first strip. In the form of connecting member described above and shown in Figures 1, 2 and 3 and in one embodiment in Figure 8, I show what might be termed a 45 degree angle connecter since it may be used to form a joint between a vertical upright and a slanting member such as might be used as a component of a slanting roof. It can be readily seen that the angle between the wall 10 and the end portion 11 may be originally constructed to suit certain purposes, and the flanges 8, 9, and 12 similarly arranged to hold varying sizes of constructional members at varying angles to the direction of the body portion. For a permanent construction one or more holes, as at 11a in Figure 1, may be bored in the connecting member and a bolt, screw, or other affixing means may be inserted therein or therethrough but in the preferred form, as a juvenile toy, it is best that the connection be regarded as a temporary one, readily disassembled, since children rapidly tire of a stable assembly.

In the embodiment shown in Figures 4, 5, 6, 7 and 8 I show a connecting member designed to form ordinary T joints, L joints, or X joints where the cross arms are at right angles to each other, and all right angle connections in three dimensions may be made with this form. Figure 8 shows an arrangement comprising two oppositely disposed connecting members at 14 and 15 which co-operate with the construction strips 13, 16, and 17 to form a cross-joint with arms at right angles to each other, while the jointure member 18 may be disposed at any preferred angle to the plane of the cross arms by suitably choosing the angularity of the flanges 19 and 21 relative to the longitudinal direction of the body portion contiguous to the wooden construction member 22.

Since one of the primary purposes of the invention is to aid in the instruction and amusement of children, sharp corners of flanges, etc., may be rounded off as shown in Figure 4 to protect the children from cuts or scratches which might be encountered in their first inexperienced efforts in assembling or disassembling various shapes.

It is readily apparent that various alternative constructions and embodiments may be devised similar to those described hereinabove without any essential variation from the invention disclosed and hereinafter claimed. The connecting member not being depended for its novelty on its dimensions, it may be incorporated in the ordinary types of building construction as distinguished from what I may term the nursery dimensions. It is my intention, therefore, that the appended claims comprehend the essentials of the invention without reference to size.

What I claim is:

1. In a skeleton structure for building construction a connecting member formed from sheet metal comprising a unitary body portion and co-operating end flanges said body portion being of hollow rectangular cross section of substantial length, said co-operating end flanges being formed integrally with said body portion, two parallel sides of said body portion being extended substantially beyond said body portion and turned outwardly to form spring flanges, a third side of said body portion being continued beyond said spring flanges and turned inwardly to form a co-operating spring flange, a building strip being inserted in said body portion and secured therein by frictional contact, a second building strip being retained between said outwardly turned and inwardly turned spring flanges by frictional contact.

2. A structural connecting member formed from sheet metal, said member comprising a hollow tubular body portion of rectangular cross section split longitudinally along the meeting line of two adjacent sides, said body portion being bounded at its innermost end by a stoppage means formed by bending inwardly a portion of one of the sides adjacent the longitudinal slit so as to retain in definite but removable relationship a building strip, the two parallel sides of said body portion adjacent the aforesaid inwardly-bent side being bent outwardly, beyond said body portion, to form spring flanges, the fourth and remaining side of said body portion being extended beyond said spring flanges, and then bent inwardly and parallel to said spring flanges to form an auxiliary spring flange, said spring flange being separated an amount substantially equal to the width of the aforesaid building strip.

3. In a skeleton building structure a connecting member formed from sheet metal comprising a unitary body portion and cooperating end flanges, said body portion being of hollow rectangular cross section of substantial length, said cooperating end flanges being formed integrally with said body portion, two parallel sides of said body portion being extended substantially beyond said body portion and being turned outwardly to form supporting flanges, a third side of said body portion being continued beyond said supporting flanges and turned inwardly to form a cooperating flange, a building strip being inserted in said body portion and secured therein by frictional contact, a second building strip being retained between said supporting and cooperating flanges.

4. In a skeleton structure for building construction a connecting member suitable for making jointures in any desired angular relationship, said connecting member formed from sheet metal comprising a unitary body portion and cooperating end flanges, said body portion being of hollow rectangular cross section of substantial length, said cooperating end flanges being formed integrally with said body portion, two parallel sides of said body portion being extended substantially beyond said body portion and turned outwardly to form supporting flanges, a third side of said body portion being continued beyond said spring flanges and turned inwardly to form a cooperating flange, a building strip being inserted in said body portion, a second building strip being retained between said outwardly and inwardly turned flanges.

HARRY BAUER.